(12) United States Patent
Schaub et al.

(10) Patent No.: US 9,495,266 B2
(45) Date of Patent: Nov. 15, 2016

(54) VOICE RECOGNITION VIRTUAL TEST ENGINEERING ASSISTANT

(71) Applicant: Advantest Corporation, Tokyo, CA (US)

(72) Inventors: Keith Schaub, Austin, TX (US); Hui Yu, San Jose, CA (US); Minh Diep, San Jose, CA (US)

(73) Assignee: ADVANTEST CORPORATION, Tokyo (JP)

(*) Notice: Subject to any disclaimer, the term of this patent is extended or adjusted under 35 U.S.C. 154(b) by 192 days.

(21) Appl. No.: 14/279,178

(22) Filed: May 15, 2014

(65) Prior Publication Data

US 2014/0344627 A1  Nov. 20, 2014

Related U.S. Application Data

(60) Provisional application No. 61/824,342, filed on May 16, 2013.

(51) Int. Cl.
| | |
|---|---|
| G06F 11/00 | (2006.01) |
| G06F 11/26 | (2006.01) |
| G06F 3/0488 | (2013.01) |
| G06F 11/32 | (2006.01) |

(52) U.S. Cl.
CPC ........... *G06F 11/26* (2013.01); *G06F 3/0488* (2013.01); *G06F 11/321* (2013.01)

(58) Field of Classification Search
CPC .... G06F 11/26; G06F 11/30; G06F 11/2635; G06F 11/263; G06F 11/2733; G06F 11/32; G06F 11/321; G06F 3/0488

USPC .................. 714/46, 25, 27, 31, 37
See application file for complete search history.

(56) References Cited

U.S. PATENT DOCUMENTS

| | | | | |
|---|---|---|---|---|
| 2002/0010679 | A1* | 1/2002 | Felsher | G06F 19/322 705/51 |
| 2003/0229500 | A1* | 12/2003 | Morris | G10L 15/26 704/275 |
| 2008/0016385 | A1* | 1/2008 | Hollingsworth | G06F 11/32 714/3 |
| 2012/0042213 | A1* | 2/2012 | Zimmerman | H04L 43/12 714/46 |
| 2014/0101608 | A1* | 4/2014 | Ryskamp | G06F 3/0482 715/810 |
| 2014/0142949 | A1* | 5/2014 | Newman | G10L 15/26 704/275 |
| 2015/0162018 | A1* | 6/2015 | Palanisamy | G10L 13/00 704/275 |

* cited by examiner

*Primary Examiner* — Joseph D Manoskey

(57) ABSTRACT

System and method of systems and methods of controlling an IC test equipment in response to verbal commands issued by test equipment users. A control apparatus according to the present disclosure includes a speech detection device operable to detect verbal commands and test control software configured to control operations of the test equipment. The control software is added with verbal command recognition capabilities. Program action commands defined in the test control software are associated with respective recognizable verbal commands. Upon a recognizable verbal command is detected, it is interpreted into the corresponding program action command which triggers the intended test program actions. The control apparatus may also have a gesture detection device, through which user gesture commands can be detected and interpreted into corresponding program actions commands.

18 Claims, 7 Drawing Sheets

Voice Command List:

| Action | Voice Command |
|---|---|
| Load Test Plan | Anna Please Load the Test Plan |
| | Anna Please Load the Test Program |
| Reload Test Plan | Anna Please Reload the Test Plan |
| | Anna Please Reload the Test Program |
| Unload Test Plan | Anna Please Unload the Test Plan |
| | Anna Please Unload the Test Program |
| Run Target Test | Anna Please Run the Target Test |
| Suspend Target Test | Anna Please Suspend on the Target Test |
| Unsuspend Target Test | Anna Please Unsuspend on the Target Test |
| Run Last Test | Anna Please Run the Last Test |
| Suspend Last Test | Anna Please Suspend on the Last Test |
| Unsuspend Last Test | Anna Please Unsuspend on the Last Test |
| Retest | Anna Please Retest |
| Cancel Execution | Anna Please Cancel Execution |
| SECBD Level | Anna Please Show Me SECBD Level |
| SECBD Timing | Anna Please Show Me SECBD Timing |
| SECBD Pattern Execution | Anna Please Run SECBD Pattern |
| SECBD PMU Measurement | Anna Please Run SECBD PMU Measurement |
| SECBD DPS Measurement | Anna Please Run SECBD DPS Measurement |
| SECBD Shmoo | Anna Please Run SECBD Shmoo |
| Open Flow Editor | Anna Please Open Flow Tool |
| Open Wave Scope | Anna Please Open Wave Scope tool |
| Open Wave Tool | Anna Please Open Wave Tool |
| Open Logic Analyzer Tool | Anna Please Open Logic Analyzer Tool |
| Run Script 1 | Anna Please Run Script 1 |
| Run Script 2 | Anna Please Run Script 2 |
| Run Script 3 | Anna Please Run Script 3 |
| Run Script 4 | Anna Please Run Script 4 |
| Run Script 5 | Anna Please Run Script 5 |
| Run Script 6 | Anna Please Run Script 6 |
| Run Script 7 | Anna Please Run Script 7 |
| Run Script 8 | Anna Please Run Script 8 |
| Run Script 9 | Anna Please Run Script 9 |
| Disconnect Kinect Sensor | Anna Please Disconnect |
| Close Kinect Sensor | Anna Please Exit |
| Open Help Page | Anna Please Help |

VOICE RECOGNITION VIRTUAL TEST ENGINEERING ASSISTANT

CROSSREFERENCE

The present patent application claims priority to the provisional patent application No. 61/824,342, filed on May 16, 2013, which is hereby incorporated by reference in its entirety.

TECHNICAL FIELD

The present disclosure relates generally to the field of semiconductor test equipments and, more specifically, to the field of test equipment control.

BACKGROUND

In semiconductor manufacturing, an automatic test equipment is used to test an integrated circuit (IC) device (known as the Device Under Test (DUT) or Unit Under Test (UUT)) e.g., to characterize electrical properties, detect abnormalities, and evaluate product quality. During test operations, test signals are provided to the DUT and the resultant output signals generated from the DUT are evaluated against expectation values.

An automated test equipment can be controlled by test control software running in an external control apparatus, typically a personal computer. The control apparatus can execute test plans configured in the software in response to operators' input and thereby generate control signals for the operations of the test equipment. The test control software can render a graphical user interface through which a user can provide instructions to control test operations, such as selecting a test plan, configuring a test, setting test signal parameters, etc.

Conventionally, a user of the test equipment interacts with the test control software by using a monitor, a keyboard and a mouse that are attached to the control apparatus. As the control apparatus is typically located some distance from the test equipment in a production facility, e.g., in a different room, a user is unable to simultaneously perform manual operations (e.g., debugging the load board) at the test head and interact with the control apparatus. Thus, the user often feels tethered to the vicinity of the control apparatus.

Moreover, the keyboard and mouse often superimpose an inefficient mechanism for using graphical user interface that the test engineer navigates often also using complex and cumbersome syntax in order to program and interact with the test control software.

In addition, a control apparatus is usually a computer loaded with non-work related application programs as well as the test control software. The computer is often misused by equipment operations for non-work related activities, e.g., Internet surfing and on-line chatting, etc.

SUMMARY OF THE INVENTION

Therefore, it would be advantageous to provide an intuitive mechanism to facilitate user interactions with a control apparatus of a test equipment.

Provided herein are systems and methods of controlling a test equipment in response to verbal commands issued by one or more test equipment users. A control apparatus according to the present disclosure includes a speech detection device operable to detect verbal commands and test control software configured to control operations of the test equipment. The control software is added with verbal command recognition capabilities. Program action commands defined in the test control software are associated with respective recognizable verbal commands. Upon a recognizable verbal command being detected, it is interpreted into the corresponding program action command which triggers the intended test program actions. Feedback confirmation may be employed. The control apparatus may also have a gesture detection device, through which user gesture commands can be detected and interpreted into corresponding program actions commands.

As a test equipment operator can advantageously issue verbal commands to the control apparatus remotely using embodiments of the present disclosure, the operator can advantageously perform manual diagnosis near the test equipment and control a test operation through the test control software at the same time. In addition, verbal commands can be designed to be simple and intuitive, eliminating the need for operators to memorize complex and error-prone syntax. Further, the usage of verbal/gesture commands bypasses the need for a keyboard and mouse to control the test equipment. A control apparatus may be used in a product facility without a keyboard and mouse, eliminating operator potential mischievous unwanted behavior and thereby improving productivity.

In one embodiment of the present disclosure, a computer implemented method of controlling a test equipment for Integrated Circuit (IC) devices comprises: (1) receiving first indications of a verbal command issued by a user; (2) interpreting the first indications into a program action command recognizable by a device diagnostic program, wherein the device diagnostic program is configured to control the test equipment to perform test procedures on electrical characteristics of one or more integrated circuit (IC) devices; and (3) providing the program action command to the device diagnostic program.

The method may further comprise rendering a graphical user interface (GUI) on a display device, wherein the GUI is configured to: display the program action command on the display device subsequent to the interpreting; and receive a user confirmation before the providing. The GUI may be configured to display a help menu comprising a plurality of program action commands recognizable by the device diagnostic program and respective audio commands associated therewith.

The method may further comprise: receiving second indications of a gesture command issued by a user, the second indications received via an imaging device; interpreting the second indications into the program action command; and providing the program action command to the device diagnostic program.

The verbal command may start with a cue phrase indicating an association between the verbal command and the device diagnostic program. The program action command may cause the device diagnostic program to: render a request for a parameter range input. The method may further comprise: receiving third indications of a first limit and a second limit that are issued by a user; and converting the indications to the parameter range input.

The method may further comprise: receiving fourth indications of facial features of a user, wherein the facial features are detected via an image device; and authenticating the user to use the device diagnostic program based on the third indications before the interpreting.

In another embodiment of the present disclosure, an electronic test system comprises: a test apparatus configured to, in response to control signals, provide test input signals to an electronic device under test and collect test output signals from the electronic device; a first communication channel; a control system coupled to the test equipment via the first communication channel. The control system comprises: a speech detection assembly configured to detect a speech event and generate first signals upon detection of the speech event; a processor; and memory coupled to the processor and comprising instructions that, when executed by the processor, causes the processor to perform a method of controlling the test apparatus responsive to user commands. The instructions comprise: (1) a speech recognition module configured to generate a speech recognition result in response to the first signals; (2) a voice command recognition module configured to determine a first program action command in response to the recognition result; and (3) a diagnostic control module operable to control the test apparatus and configured to perform one or more program actions responsive to the program action command.

In another embodiment of the present disclosure, a control system for controlling a test equipment comprises: a bus; a voice detection unit coupled to the bus and configured to detect voice commands issued from users and generate first signals responsive to the voice commands; a processor coupled to the bus; memory coupled to the processor and comprising instructions. The instructions, when executed by the processor, cause the processor to perform a method comprising: interpreting the first signals into corresponding program action commands that are actionable by a device diagnostic program, wherein the device diagnostic program is configured to control operations of the test equipment; and providing the program action commands to the device diagnostic program.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 7 is an exemplary list of verbal commands assigned to respective program action commands of a test control program in accordance with an embodiment of the present disclosure.

DETAILED DESCRIPTION

Figure 1:
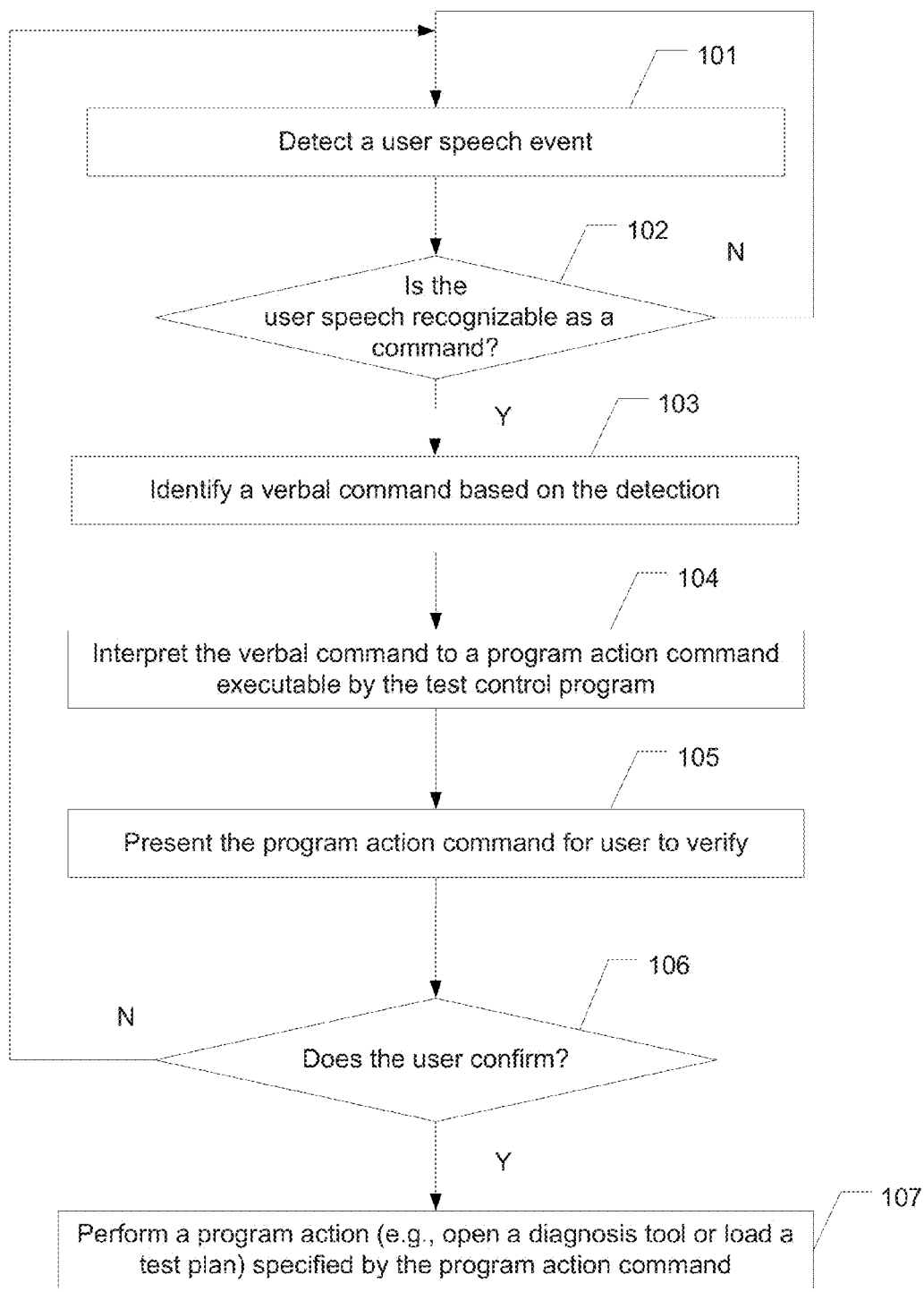
FIG. 1 is a flow chart depicting an exemplary method of controlling test equipment through a test control program based on user rendered verbal commands in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Voice Recognition Virtual Test Engineering Assistant

Overall, embodiments of the present disclosure employ a control system capable of controlling test equipment in response to user rendered verbal and/or gesture commands. The control system includes a test control program configured to control operations of the test equipment in response to user input. A user verbal/gesture command can be detected via a speech/gesture detection device and interpreted into a prescribed program action command executable by the test control program. As a result, a test operation instructed by the program action command may be performed on a semiconductor device loaded on the test equipment.

A test equipment system herein may be any semiconductor device test equipment that is well known in the art. For example, it may be a simple computer controlled digital multimeter, or a complicated system containing complex test instruments (real or simulated electronic test equipment) capable of automatically testing and diagnosing faults in sophisticated electronic packaged parts or on wafer testing, including System-On-Chips (SoCs) and Integrated Circuits (ICs). A test control program herein is a software program customized for the associated test equipment.

FIG. 1 is a flow chart depicting an exemplary method 100 of controlling a test equipment through test control program based on user verbal commands in accordance with an embodiment of the present disclosure. At 101, a user speech event is detected and signals representing the speech are generated, e.g., via a microphone device attached to the control apparatus. At 102, based on the signal, it is determined whether the user speech is recognizable as a verbal command by the test control program. Recognizable commands are associated with respective executable commands (or program action commands) defined by the test control program. It will be appreciated that any program action based on a user input can be assigned with a verbal command. If unrecognizable, the speech is ignored.

If the speech is recognized, then a verbal command is identified at 103 based on the signals. At 104, the verbal command is interpreted into a program action command executable by the test control program. At 105, the identified program action command is optionally presented to the user for verification to proceed. For example, the identified program action command may be displayed in a display device, or repeated through a speaker.

If the user confirms at 106 that the identified program action command is intended by the user speech, a corresponding program action is performed at 107. Some program action commands may directly result in generation of control signals controlling the operation of test equipment, e.g., applying test signals on the devices under test. Other program actions may be used as user input to prompt other types of program actions as defined in the program, such as opening a diagnosis function module or to input parameters, etc.

In some embodiments, the control apparatus is equipped with a gesture recognition mechanism coupled to the test control program. Similar with verbal command recognition, a user gesture can be recognized and interpreted as a command executable by the test control program. In some embodiments, the control apparatus is equipped with an imaging device and a facial recognition program, where a user's facial features can be detected and recognized to authenticate the user for using the test control system including the verbal/gesture command control.

Figure 2:
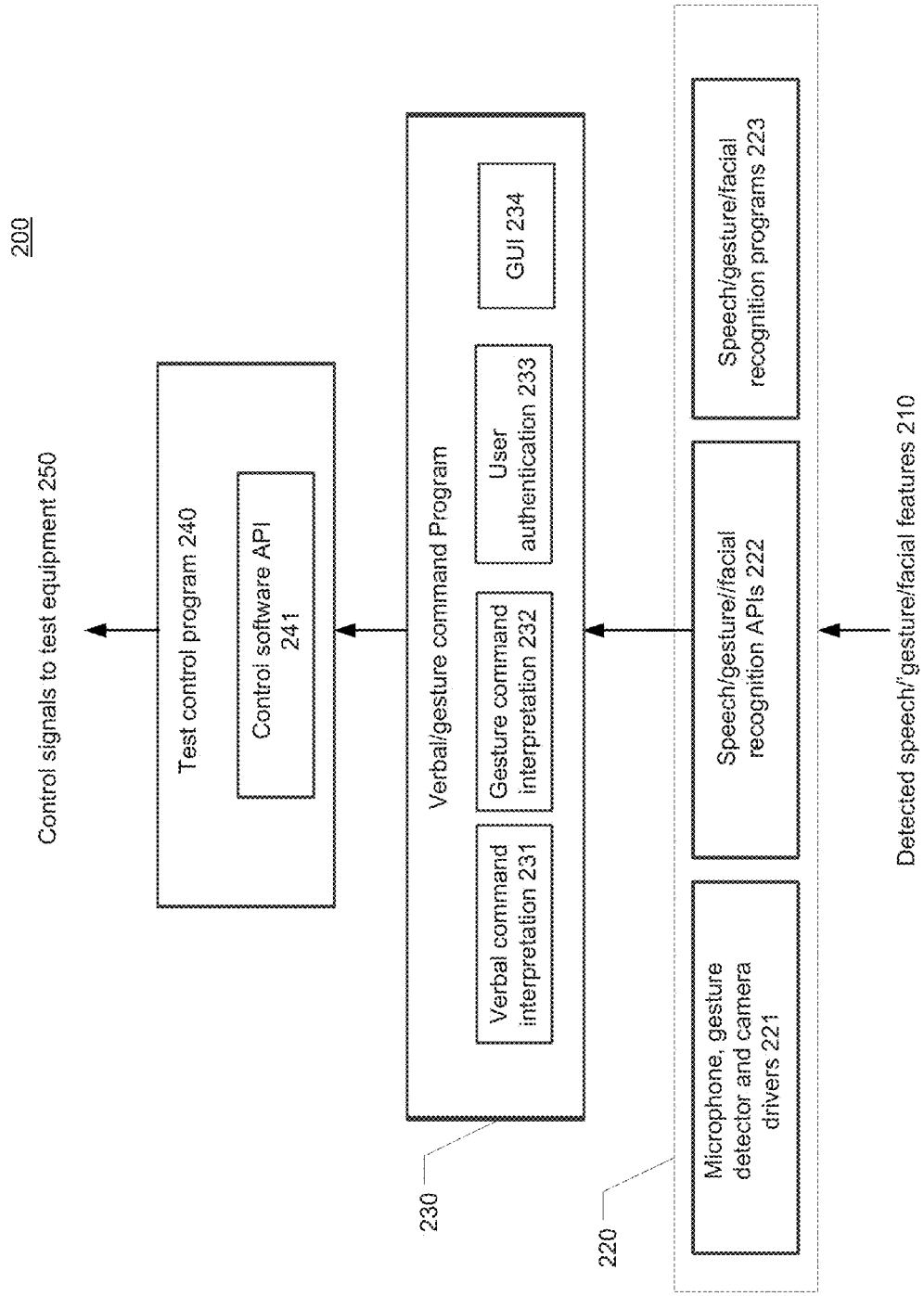
FIG. 2 illustrates an exemplary integration architecture of software programs enabling a control apparatus to control a test equipment by user verbal and/or gesture commands in accordance with an embodiment of the present disclosure.

FIG. 2 illustrates an exemplary integration architecture 200 of software programs enabling a control apparatus to control a test equipment by user verbal and/or gesture commands in accordance with an embodiment of the present disclosure. As illustrated, to yield a control signal for the test equipment, user speech/gesture are detected and converted to signals which are processed through three levels of programs: the speech/gesture/facial feature recognition level 220, a command interpretation level 230 and the test control level 240.

The recognition level 220 programs collaborate to translate the detected speech/gesture into text. This level includes driver programs (or drivers) 221, recognition application programming interfaces (APIs) 222, and recognition applications 223 for a microphone, a gesture detector and a camera. The drivers 221 enable the user input devices (e.g., microphone, camera, and gesture detector) to interact with the operating system of the control apparatus. The recognition APIs 222 provide a programming interface for program developers to program the speech/gesture/facial recognition program 223.

The respective recognition applications 223 process an input speech/gesture element into corresponding text. The speech recognition application may carry any audio processing feature that is well known in the art, such as natural language processing, automatic correction, dictation, disambiguation, interactive tutorial, personalization/adaption, support for multiple languages, acoustic noise suppression, echo cancellation, beam formation to identify the current sound source, etc. The gesture recognition application may utilize any feature that is well known in the art, such as automatic detection and localization, 3D gesture recognition, body pose estimation, motion tracking, feature extraction, real time reaction, etc.

The interpretation level 230 has a GUI module 234 and interpretation modules 231-233 for verbal commands, gesture commands, and facial features, respectively. The translated text from level 220 is fed to a suitable command interpretation module in the command interpretation level 230 and is interpreted into a program action command recognizable by the test control program 240. The interpretation processes can be implemented in any suitable method or process that is well known in the art. As to be described in greater detail, the GUI module 234 can render a GUI, e.g., for displaying identified program action commands, and for receiving user adjustment on various features in the recognition application programs 223.

The program action command identified from the interpretation level 230 is then provided to a test control program 240 for execution. The test control program 240 interacts with the interpretation level 230 through the control software API 241. In effect, the test control program 240 can be controlled by a user verbal/gesture command.

Various functionalities described in FIG. 2 can be combined into an integrated program or partitioned and implemented as separate modules. As will be appreciated by those with ordinary skill in the art, the various programs described in FIG. 2 can be implemented in any one or more suitable programming languages that are known to those skilled in the art, such as C, C++, Java, Python, Perl, C#, VB/VBS, etc.

Figure 3:
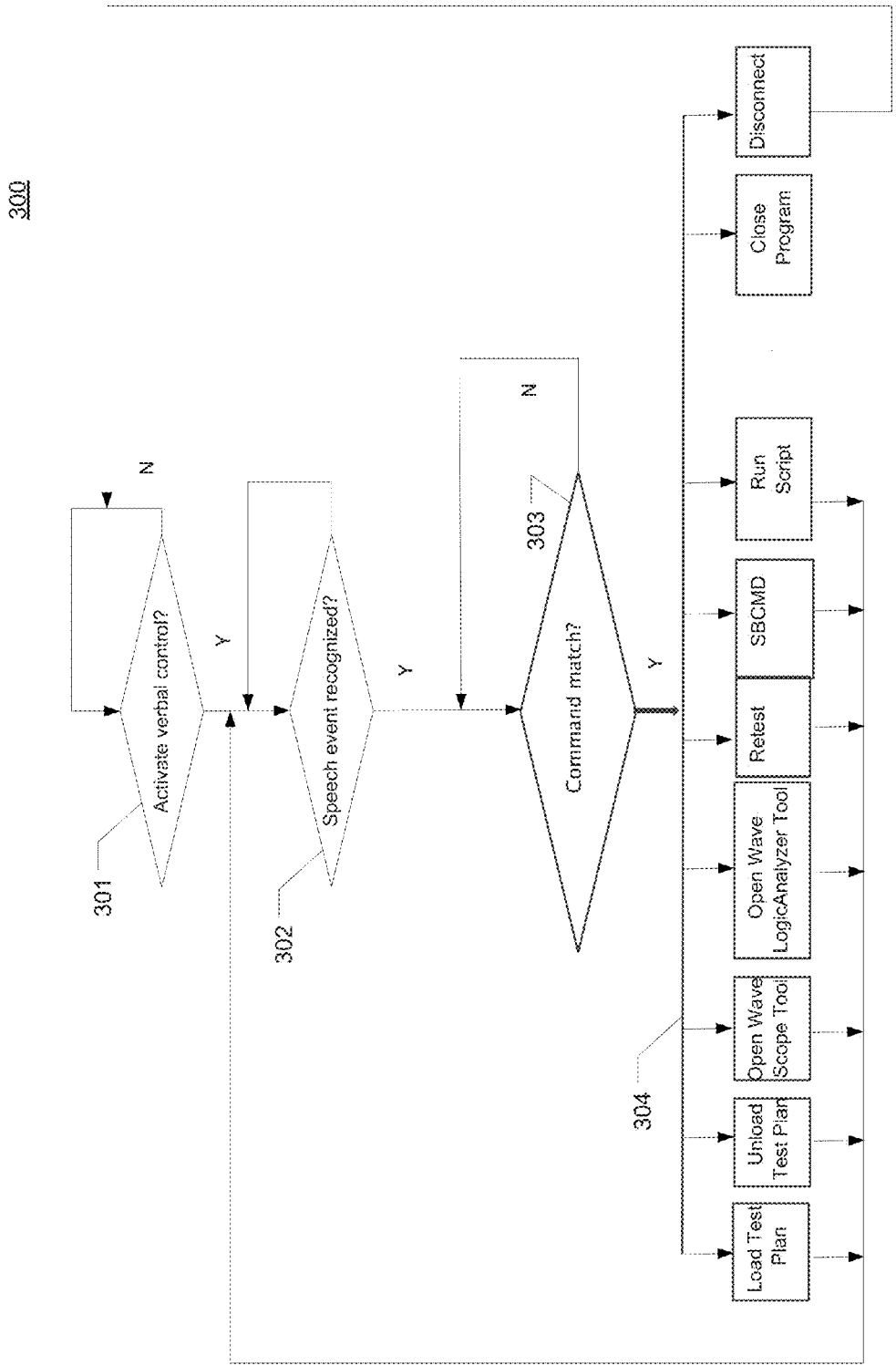
FIG. 3 is a flow chart depicting an exemplary process of verbal command interpretation in accordance with an embodiment of the present disclosure.

FIG. 3 is a flow chart depicting an exemplary process 300 of verbal command interpretation in accordance with an embodiment of the present disclosure. At 301, the verbal command control is activated, for example automatically each time the computer is powered up, or based on a user instruction. In some embodiments, an authentication process may be performed prior to the activation to verify the user's right to use the test control program as well as to record control activities in a use session.

If a detected speech event is recognized at 302, the speech is processed as a verbal command at 303 and then translated into one of the selected program action commands recognizable by the test control program in 304. In this example, the program action commands assigned with verbal commands includes loading test plan, unloading test plan, opening Wavescope tool, opening Wave Logic Analyzer tool, retesting, SBCMD level configuration, running a script, closing the test control program, disconnecting the verbal control. It will be appreciated that any user instruction or input (e.g., setting test parameters) defined in the test control program can be selected and assigned with one or more verbal/gesture commands. The selected program action commands may be most frequently used commands.

Figure 4:
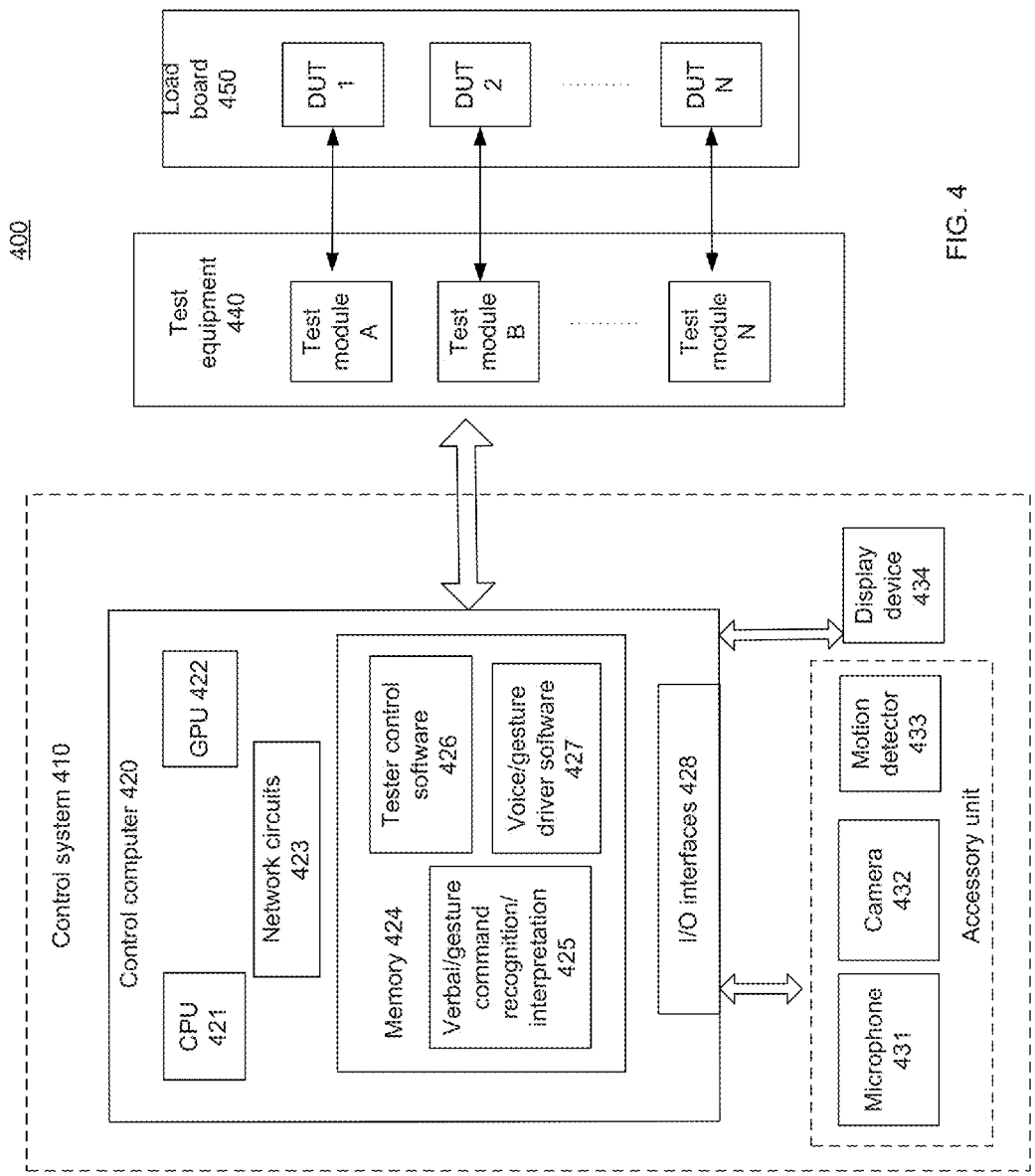
FIG. 4 illustrates an exemplary test system including a test equipment system and a control system capable of controlling the test equipment system in response to user verbal and/or gesture commands in accordance with an embodiment of the present disclosure.

FIG. 4 illustrates an exemplary test system 400 including a test equipment 440 and a control system capable of controlling the test equipment 440 in response to user verbal and/or gesture commands in accordance with an embodiment of the present disclosure. The control system 410 upon which embodiments of the present disclosure may be implemented includes a general purpose computer 420 and peripherals 431-434. The test equipment 440 is coupled with a load board used to accommodate the devices under test.

In the simplified form, the control computer includes a CPU 421 (e.g., a dual-core 2.66 GHz processor), a GPU 422, network circuits 423, memory 424, and I/O interfaces 428. Depending on the individual configuration and type of the computer, memory may be volatile (such as RAM), non-volatile (such as ROM, flash memory, etc.) or some combination thereof. The peripherals, including a microphone 431, a camera 432, and a motion detector 433, are coupled to the computer through I/O interfaces 428.

A test control program 426, voice/gesture detection device drivers 427, and verbal/gesture command recognition/interpretation programs 425 are stored in a memory device 424 and runs on an operation system. Functionalities of the programs are described in greater detail with reference to FIG. 2. The operation system may be any suitable operation system (OS), such as Windows Embedded POSREADY7, Windows 7, Windows 8 Consumer Preview, or Windows Embedded Standard 7, etc. The CPU 421 can execute the programs 425-426 based on user instructions, including those issued by voice or gesture as described above. Thereby control signals can be determined and conveyed to the test equipment 440 through a communication channel 450.

The test equipment 440 includes a plurality of test modules A, B, . . . , N. Each module is connected with terminals of a device under test (DUT) and can perform testing on the DUT based on the control signals generated by the control system 410.

For instance, a test module can generate a test signal from the test data on the basis of a sequence predetermined by the test control program and provides the test signal to the DUT terminals. In response, the DUT can generate an output signal which is compared with an expectation value. Then the test module can send the output signal data and the expectation values back to the control computer 420.

The control computer 420 may also comprise an optional graphics subsystem for presenting information to the computer user, e.g., by displaying information on an attached display device 434, connected by a video cable. According to embodiments of the present disclosure, the graphics subsystem may be coupled directly to the display device 434 through the video cable. In alternate embodiments, display device may be integrated into the computing system (e.g., a laptop or touchpad) and does not require a video cable.

Additionally, the control computer 420 may also have additional features and functionalities. For example, computing system 400 may also include additional storage media (removable and/or non-removable) including, but not limited to, magnetic or optical disks or tape. Computer storage media includes volatile and nonvolatile, removable and non-removable media implemented in any method or technology for storage of information such as computer readable instructions, data structures, program modules or other data.

The control computer 420 also includes an optional alphanumeric input device, an optional cursor control or directing device, and one or more signal communication interfaces (input/output devices, e.g., a network interface card). Optional alphanumeric input device can communicate information and command selections to central processor. Using network circuits 423 and a communication interface, the control computer 420 can be communicatively coupled to other computer systems over a communication network such as the Internet or an intranet (e.g., a local area network), or can receive data (e.g., a digital television signal).

It will be appreciated that any suitable type of sensing mechanism of the speech detection device (e.g., a microphone) or gesture detection device can be used to receive user commands for purposes of practicing the present disclosure. The gesture detection device may be capable of recognizing bodily motion or static gestures such as formed by a hand or face. The gesture detection device may have a standard 2D camera, wired gloves, depth-aware cameras, stereo camera, or remote controllers.

The detection devices may be built-in devices of the control computer, separate peripherals attachable to the control computer through USB ports, or components of an integrated peripheral (e.g., Microsoft Kinect™). In some embodiments, the speech detection device or gesture detection device are capable of communicating with the control compute through wireless channels, so that a user can carry them around.

Figure 5A:
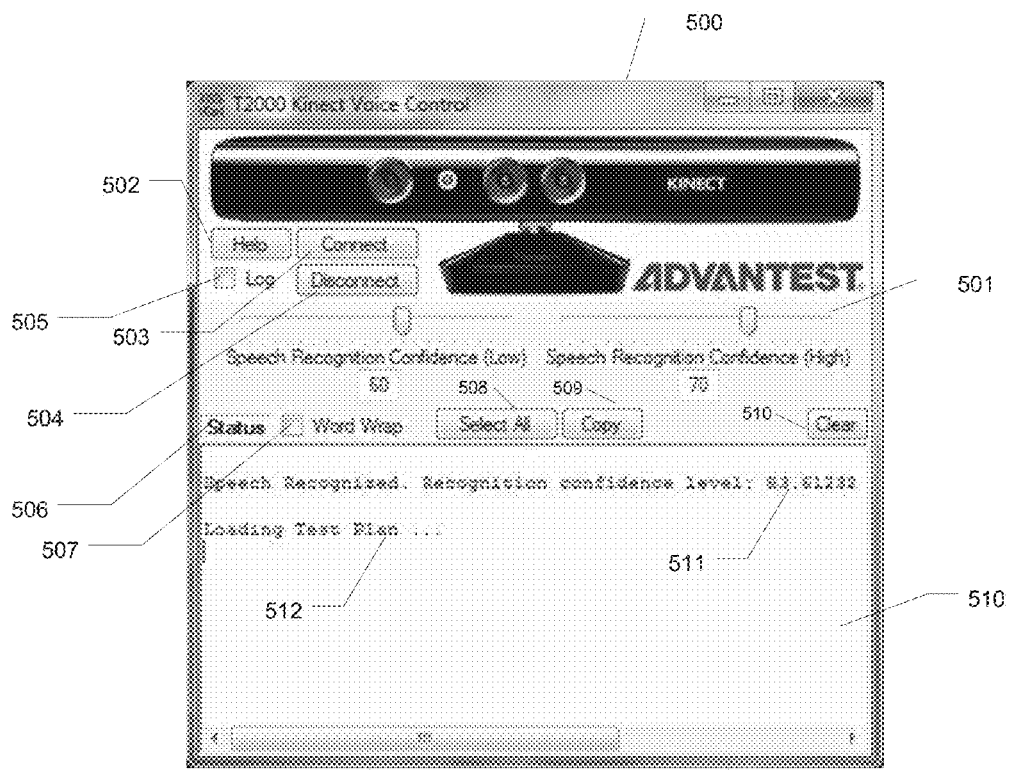
FIG. 5A is a screenshot of an exemplary GUI through which a user can interact with a verbal command control assembly of a test control apparatus in accordance with an embodiment of the present disclosure.

FIG. 5A is a screenshot of an exemplary GUI 500 through which a user can interact with a verbal command control assembly of a test control apparatus in accordance with an embodiment of the present disclosure. The verbal command control assembly includes pertinent hardware and software implementations enabling a user to control the test equipment by issuing verbal commands as described with reference to FIGS. 1-4. In this example, the GUI 500 is customized for a commercially available accessory peripheral (Microsoft Kinect™) with the integrated capabilities of detecting user speeches, gestures, and facial features. However, it will be appreciated that the present disclosure is not limited any specific GUI configuration or design.

The GUI 500 includes a status text box 510 for displaying information regarding verbal command recognitions (or recognition failures) and program actions that are invoked by detected verbal/gesture commands. Two slide bars 501 allow users to adjust speech recognition confidence according to their individual traits of voices. The "Help" GUI button allows a user to bring up a verbal command reference manual, as to be described in greater detail below. The "Connect" button allows the user to connect and initialize the accessory peripheral, and initialize the associated speech recognition program. The "Disconnect" button allows the users to disconnect the accessory peripheral. The "Log" check box allows users to log status information to a file. The "Word Wrap" check box, "Select All" button, "Copy" button, and "Clear" button allow users to manipulate the text displayed in the status text box 510.

In this example, two text lines 511 and 512 are displayed in the status text box 510 upon detection of a verbal command, e.g., "Anna please load the Testplan." Line 511 displays date of the recognition confidence level. Line 512 displays the program action command "Loading Test Plan" translated from the verbal command.

Figure 5B:
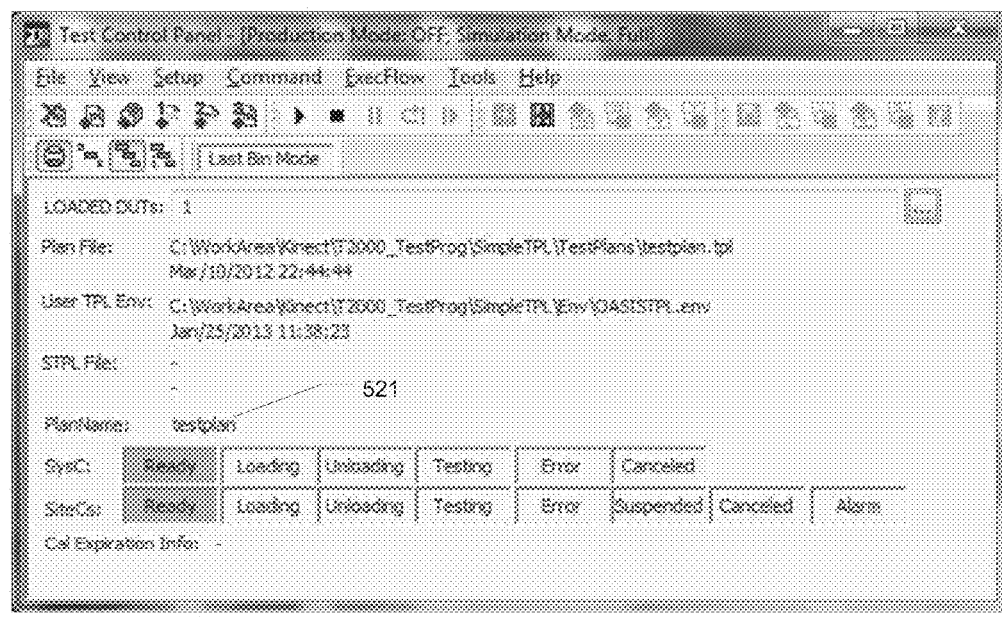
FIG. 5B is a screenshot of an exemplary GUI prompted by a program action command that is translated from a verbal command in accordance with an embodiment of the present disclosure.

Upon receiving a program action command, the test control program may correspondingly render a GUI window to display information regarding the testing processes and results. FIG. 5B is a screenshot of an exemplary GUI 520 prompted by a program action command that is translated from a verbal command in accordance with an embodiment of the present disclosure. The test line 521 shows the identified test plan, named "testplan," is being loaded.

Figure 6:
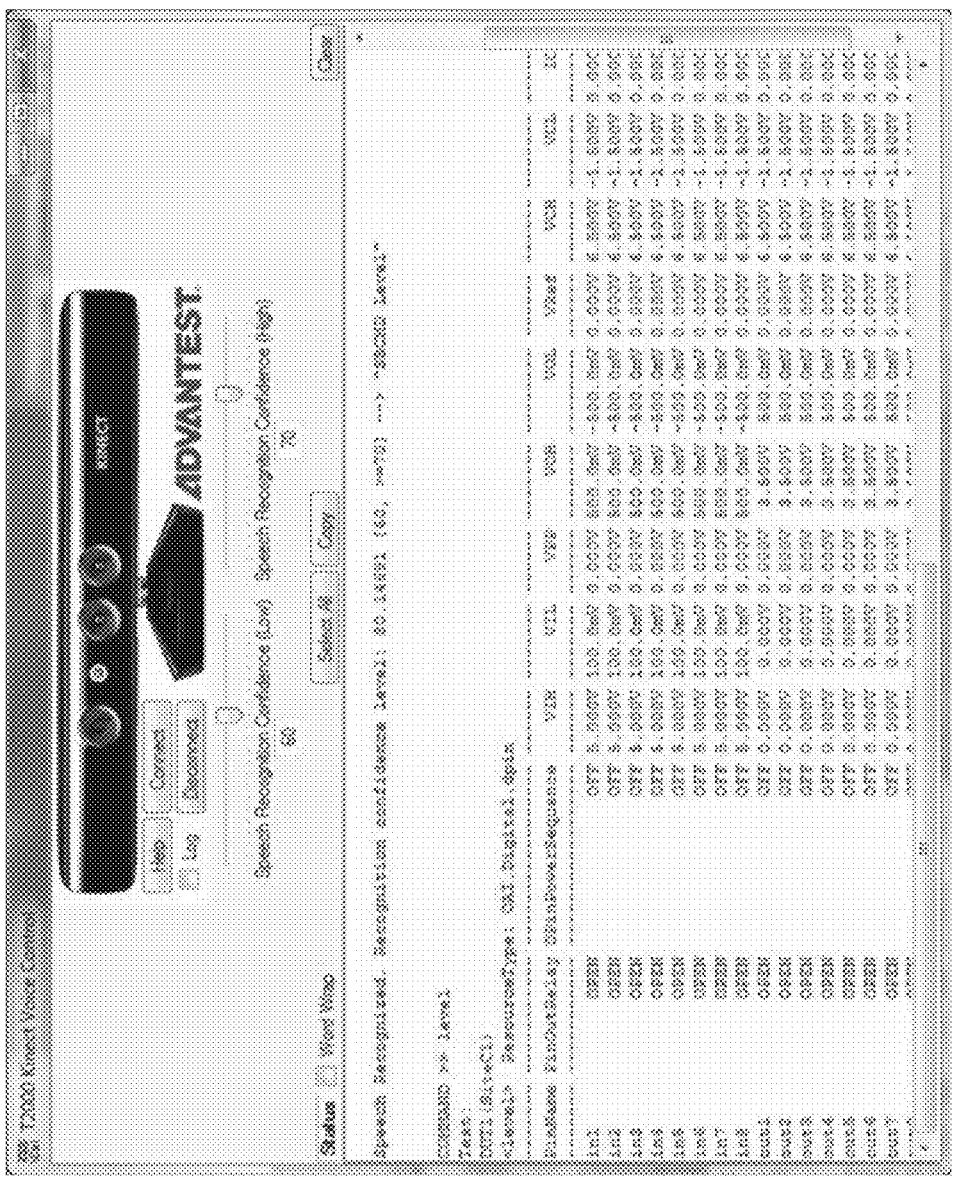
FIG. 6 is a screenshot of a GUI window showing the program actions responsive to a verbal command calling for a script-based command in accordance with an embodiment of the present disclosure.

A test control program may allow users to compile a series of program actions into a script file, e.g., a script based command (SBCMD). A verbal command calling out the script file can effectively invokes all the program actions defined therein. For example, a script may aggregate instructions for the test equipment to run a sequence of measurements on a DUT including, e.g., power consumption, continuity, voltage thresholds, timing, waveforms, and etc. FIG. 6 is a screenshot of a GUI window showing the program actions responsive to a verbal command calling for a script-based command in accordance with an embodiment of the present disclosure.

FIG. 7 is an exemplary list of verbal commands assigned to respective program action commands of a test control program in accordance with an embodiment of the present disclosure. The left column lists all the frequently used program action commands. The right column lists the corresponding verbal commands. In this example, each verbal command starts with a cue phrase "Anna" as an indication that the following should be treated as a verbal command. The available verbal commands are listed in a "Help" file which can be used as a reference manual upon a user request, e.g., by a verbal command.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of controlling test equipment for Integrated Circuit (IC) devices, said method comprising:
   receiving first indications of a verbal command issued by a user;
   interpreting said first indications into a program action command recognizable by a device diagnostic program, wherein said device diagnostic program is configured to control said test equipment to perform test procedures on electrical characteristics of one or more integrated circuit (IC) devices; and
   providing said program action command to said device diagnostic program for execution therof, wherein said program action command is operable to trigger said device diagnostic program to perform a program action selected from a group consisting of: rendering to display a GUI, loading a test plan, unloading a test plan, retesting, opening a diagnostic function module, opening an analyzing function module, running a target test, suspending a target test, rebooting, disabling audio control, setting a parameter for a test, cancelling a diagnostic execution, running a command script, debugging an IC device under test, and exiting said device diagnostic program.

2. The computer implemented method of claim 1 further comprising rendering a graphical user interface (GUI) on a display device, wherein said GUI is configured to: display said program action command on said display device subsequent to said interpreting; and receive a user confirmation before said providing.

3. The computer implemented method of claim 2, wherein said GUI is further configured to display a help menu comprising a plurality of program action commands recognizable by said device diagnostic program and respective audio commands associated therewith.

4. The computer implemented method of claim 1 further comprising:
   receiving second indications of a gesture command issued by a user, said second indications received via an imaging device;
   interpreting said second indications into said program action command; and
   providing said program action command to said device diagnostic program.

5. The computer implemented method of claim 1, wherein said verbal command starts with a cue phrase indicating an association between said verbal command and said device diagnostic program.

6. The computer implemented method of claim 1, wherein said program action command causes said device diagnostic program to: render a request for a parameter range input, and further comprising: receiving second indications of a first limit and a second limit that are issued by a user; and converting said second indications to said parameter range input.

7. The computer implemented method of claim 1 further comprising:
   receiving second indications of facial features of a user, wherein said facial features are detected via an image device; and
   authenticating said user to use said device diagnostic program based on said second indications before said interpreting.

8. A system comprising:
   a test apparatus configured to, in response to control signals, provide test input signals to an electronic device under test and collect test output signals therefrom;
   a first communication channel;
   a control system coupled to said test equipment via said first communication channel, said control system comprising:
      a speech detection assembly configured to detect a speech event and generate first signals upon detection of said speech event;
      a processor;
      memory coupled to said processor and comprising instructions that, when executed by said processor, cause the processor to perform a method of controlling said test apparatus responsive to user commands, said instructions comprising:
         a speech recognition module configured to generate a speech recognition result in response to said first signals;
         a voice command recognition module configured to determine a first program action command in response to said recognition result; and
         a diagnostic control module operable to control said test apparatus and configured to perform one or more program actions responsive to said first program action command, wherein said one or more program actions are selected from a group consisting of:

rendering to display a GUI, loading a test plan, unloading a test plan, retesting, opening a diagnostic function module, opening an analyzing function module, running a target test, suspending a target test, rebooting, disabling audio control, setting a parameter for a test, cancelling a diagnostic execution, running a command script, debugging an IC device under test, and exiting a device diagnostic program.

9. The system of claim 8, wherein said control system further comprises a motion detection assembly configured to detect a gesture event from a user and generate second signals, wherein said instructions further comprise a gesture recognition module configured to determine a second program action command in response to said second signals.

10. The system of claim 9, wherein said speech detection assembly and said motion detection assembly are integrated in an accessory peripheral device coupled to said processor.

11. The system of claim 8, wherein said voice command recognition module comprises a list of prescribed program action commands associated with respective speech commands, and wherein aid voice command recognition module is configured to determine said first program action command by matching said recognition result with a speech command.

12. The system of claim 9, wherein said diagnostic control module is configured to determine said control signals in response to said first program action command.

13. The system of claim 9, wherein said control system further comprises a display device, and wherein said instructions further comprise a graphical user interface (GUI) module configured to render a first GUI for display on said display device, wherein said first GUI is configured to display said first program action command upon determination thereof.

14. The system of claim 9, wherein said first program action command is a user defined script comprising a series of program action commands actionable by said diagnostic control module.

15. The system of claim 9, wherein said speech detection assembly coupled to said processor through a wireless communication channel, and wherein said voice command recognition module is operable to interpret voice commands issued in various languages.

16. A control system for controlling a test equipment, said control system comprising:
a bus;
a voice detection unit coupled to said bus and configured to detect voice commands issued from users and generate first signals responsive to said voice commands;
a processor coupled to said bus;
memory coupled to said processor and comprising instructions that, when executed by said processor, cause the processor to perform a method comprising:
interpreting said first signals into corresponding program action commands that are actionable by a device diagnostic program, wherein said device diagnostic program is configured to control operations of said test equipment; and
providing said program action commands to said device diagnostic program, wherein said test equipment is configured to test electrical properties of semiconductor devices, and wherein said program action commands are configured to invoke said diagnostic program to: render to display a GUI of said device diagnostic program, load a test plan, unload a test plan, retest, open a diagnostic function module, open an analyzing function module, run a target test, suspend a target test, reboot, disable voice command control, set a parameter for a test, cancel a diagnostic execution, run a command script, debug an IC device under test, and/or exit said device diagnostic program.

17. The control system of claim 16 further comprising a motion detection unit coupled to said bus and configured to detect gesture commands issued from users and generate second signals responsive to said voice commands, wherein said method further comprises interpreting said second signals into said corresponding program action commands.

18. The control system of claim 16 further comprising a display unit coupled to said bus, wherein said method further comprises rendering to display a graphical user interface configured to display said program action command in response to detection of a voice command.

* * * * *